US012793239B2

(12) United States Patent
Park et al.

(10) Patent No.: US 12,793,239 B2
(45) Date of Patent: Nov. 10, 2026

(54) SCENE FLOW ESTIMATION APPARATUS AND METHOD

(71) Applicants: Hyundai Kefico Corporation, Gunpo (KR); Research & Business Foundation Sungkyunkwan University, Suwon (KR)

(72) Inventors: Gyu Do Park, Anyang (KR); Soo Hyeok Kang, Incheon (KR); Jong Hwan Ko, Daejeon (KR); Wencan Cheng, Suwon (KR); Min Je Kim, Suwon (KR)

(73) Assignees: Hyundai Kefico Corporation, Gyeonggi-do (KR); Research & Business Foundation Sungkyunkwan University, Gyeonggi-do (KR)

( * ) Notice: Subject to any disclaimer, the term of this patent is extended or adjusted under 35 U.S.C. 154(b) by 221 days.

(21) Appl. No.: 18/745,394

(22) Filed: Jun. 17, 2024

(65) Prior Publication Data

US 2025/0014196 A1 Jan. 9, 2025

(30) Foreign Application Priority Data

Jul. 3, 2023 (KR) ........................ 10-2023-0086085

(51) Int. Cl.
*G06T 7/20* (2017.01)
*G06T 7/246* (2017.01)
*G06T 9/00* (2006.01)

(52) U.S. Cl.
CPC .............. *G06T 7/251* (2017.01); *G06T 9/001* (2013.01); *G06T 2207/10028* (2013.01); *G06T 2210/56* (2013.01)

(58) Field of Classification Search
CPC ..................... G06T 7/251; G06T 9/001; G06T 2207/10028; G06T 2210/56;
(Continued)

(56) References Cited

U.S. PATENT DOCUMENTS

2022/0301190 A1* 9/2022 Kwak ..................... G06T 7/269

FOREIGN PATENT DOCUMENTS

| | | | | |
|---|---|---|---|---|
| CN | 116468756 A * | 7/2023 | ............. | G06T 7/269 |
| KR | 10-2018-0087947 A | 8/2018 | | |
| WO | WO-2023184622 A1 * | 10/2023 | ......... | H10D 30/6757 |

OTHER PUBLICATIONS

Wu, W., Wang, Z. Y., Li, Z., Liu, W., & Fuxin, L. (Aug. 2020). Pointpwc-net: Cost volume on point clouds for (self-) supervised scene flow estimation. In European conference on computer vision (pp. 88-107). Cham: Springer International Publishing. (Year: 2020).*

(Continued)

*Primary Examiner* — Neil R McLean
(74) *Attorney, Agent, or Firm* — Fox Rothschild LLP

(57) ABSTRACT

A scene flow estimation apparatus includes: a hierarchical feature detector detecting a hierarchical feature of point cloud data related to an image frame; a corrector correcting the detected hierarchical feature of the point cloud data; a bi-directional feature detector detecting a bi-directional scene flow feature of the corrected point cloud data, re-inputting a detection value, and repeatedly detecting the bi-directional scene flow feature; and an inferrer inferring a next scene flow of the image frame by using the bi-directional scene flow feature.

9 Claims, 11 Drawing Sheets

(58) Field of Classification Search
CPC ........... G06T 2207/10016; G06T 7/246; G06T 7/269; G06T 7/277; G06T 2207/20084; G06T 3/18; G06T 3/4007; G06T 7/70; G06V 10/40
USPC .......................................................... 382/103
See application file for complete search history.

(56) References Cited

OTHER PUBLICATIONS

W. Cheng et al., "Bi-PointFlowNet: Bidirectional Learning for Point Cloud Based Scene Flow Estimation." arXiv preprint arXiv:2207.07522 (Jul. 15, 2022), pp. 1-17.
Y. Kittenplon, et al., "FlowStep3D: Model Unrolling for Self-Supervised Scene Flow Estimation" (Nov. 19, 2020), pp. 1-10.
W. Wu et al., "PointPWC-Net: Cost volume on Point Clouds for (Self-)Supervised Scene Flow Estimation", arXiv:1911.12408v2, Jul. 31, 2022, 25 pages.
Y. Shen et al., "Self-Supervised 3D Scene Flow Estimation Guided by Superpoints", PCA Lab, Nanjing University of Science and Technology, Nanjing, China, arXiv:2305.02528v1, May 4, 2023, 10 pages.
X. Liu et al., "FlowNet3D: Learning Scene Flow in 3D Point Clouds", arXiv:1806.01411v3, Jul. 21, 2019, 14 pages.

* cited by examiner

FIG. 4A

```
#L2
up_flow2 = self.upsample(pc1_l2, pc1_l3, self.scale * flow3)
pc2_l2_warp =self.warping(pc1_l2, pc2_l2, up_flow2)
feat1_new_l2, feat2_new_l2, cross2 = self.cross2(pc1_l2, pc2_l2_warp, c_feat1_l2, c_feat2_l2)

feat3_up = self.upsample(pc1_l2, pc1_l3, feat3)
new_feat1_l2 = torch.cat([feat1_l2, feat3_up], dim =1)
feat2, flow2 = self.flow2(pc1_l2, new_feat1_l2, cross2, up_flow2)

feat1_l2_1 = self.upsample(pc1_l1, pc1_l2, feat1_new_l2)
feat1_l2_1 = self.deconv2_1(feat1_l2_1)

feat1_l2_1 = self.upsample(pc2_l1, pc2_l2, feat2_new_l2)
feat1_l2_1 = self.deconv2_1(feat2_l2_1)

c_feat1_l1 = torch.cat([feat1_l1, feat1_l2_1], dim =1)
c_feat1_l1 = torch.cat([feat2_l1, feat2_l2_1], dim =1)
```

APPLYING LOOP TO
FEATURE EXTRACTION

FIG. 4B

APPLYING LOOP TO FEATURE EXTRACTION

AFTER CHANGE

```
#L2
up_flow2 = self.upsample(pc1_l2, pc1_l3, self.scale * flow3)
flow2 = [ ]
for i in range(self.iters) :
    pc2_l2_warp = self.warping(pc1_l2, pc2_l2, up_flow2)
    feat1_new_l2, feat2_new_l2, cross2 = self.cross2(pc1_l2, pc2_l2_warp, c_feat1_l2, c_feat2_l2)

    feat3_up = self.upsample(pc1_l2, pc1_l3, feat3)
    new_feat1_l2 = torch.cat([feat1_l2, feat3_up], dim = 1)
    feat2, flow2 = self.flow2(pc1_l2, new_feat1_l2, cross2, up_flow2)
    up_flow2 = flow2
    c_feat1_l2 = torch.cat([feat1_l2, feat1_new_l2], dim = 1)
    c_feat2_l2 = torch.cat([feat2_l2, feat2_new_l2], dim = 1)
    flows2.append(flow2)

feat1_l2_1 = self.upsample(pc1_l1, pc1_l2, feat1_new_l2)
feat1_l2_1 = self.deconv2_1(feat1_l2_1)

feat2_l2_1 = self.upsample(pc2_l1, pc2_l2, feat2_new_l2)
feat2_l2_1 = self.deconv2_1(feat2_l2_1)

c_feat1_l1 = torch.cat([feat1_l1, feat1_l2_1], dim = 1)
c_feat2_l1 = torch.cat([feat2_l1, feat2_l2_1], dim = 1)
```

FIG. 6A

```
new_points = F.max_pool2d(new_points, (new_points.size(2), 1) ).squeeze(2)

return  new_points
```

FIG. 6B

```
points_max = F.max_pool2d(new_points, (new_points.size(2), 1) ).squeeze(2)

if return_vote:
    weight = self.softmax(self . vote(new_points) ) # B, I, K, N
    flow = torch.sum(weight * neighbor_xyz.permute(0, 3, 2, 1), 2) - xyz1.permute(0, 2, 1)
    return  torch.cat( (points_max, flow), 1)

return  points_max
```

ADDING

SCENE FLOW ESTIMATION APPARATUS AND METHOD

CROSS-REFERENCE TO RELATED APPLICATION

This application claims under 35 U.S.C. § 119(a) the benefit of Korean Patent Application No. 10-2023-0086085 filed in the Korean Intellectual Property Office on Jul. 3, 2023, the entire contents of which are incorporated herein by reference.

BACKGROUND

(a) Technical Field

The present disclosure relates to a scene flow estimation apparatus and method.

(b) Description of the Related Art

Bi-point flow net refers to a deep neural network model that receives point cloud data of at least two continuous frames as an input and extracts a scene flow feature bidirectionally to predict a scene flow of a next frame. Here, the point cloud data refers to data collected by a LiDAR sensor, an RGB-D sensor, etc., and distance information per light/signal reflected on an object, which is generated as one point in a 3D space, means a set of the points.

The bi-point flow net is constituted by four hierarchical structures, and may be used to predict the scene flow. The four hierarchical structures can include hierarchical feature extraction, bidirectional flow embedding, upsampling, and a flow predictor.

The bi-point flow net has a disadvantage in that it takes a long time for precise prediction due to a large computation amount in a feature detection process and a flow embedding performing process at each of a source point and a target point.

Further, the bi-point flow net has a disadvantage in that a flow prediction performance deteriorates due to application of a hierarchical single flow embedding layer.

SUMMARY

The present disclosure provides a scene flow estimation apparatus and method which apply a bi-directional flow embedding layer of an iteration performing structure to enhance flow prediction accuracy.

Further, the present disclosure provides a scene flow estimation apparatus and method which apply an initial flow inference scheme using a voting function to reduce the number of computational parameters and enhance the flow prediction accuracy.

In order to achieve the object, an exemplary embodiment of the present disclosure provides a scene flow estimation apparatus including: a controller comprising: a hierarchical feature detector detecting a hierarchical feature of point cloud data related to an image frame; a corrector correcting the detected hierarchical feature of the point cloud data; a bi-directional feature detector detecting a bi-directional scene flow feature of the corrected point cloud data, re-inputting a detection value, and repeatedly detecting the bi-directional scene flow feature; and an inferrer inferring a next scene flow of the image frame by using the bi-directional scene flow feature.

The bi-directional feature detector may detect an initial scene flow of the point cloud data by using a predetermined voting block.

The directional feature detector calculates a voting value of grouped group points of the point cloud data by applying SoftMax to the voting block, and adds point groups with the voting value as a weight to extract an initial movement location used for detecting the initial scene flow.

The inferrer may infer a scene flow of the next image frame by correcting the initial scene flow by using the bi-directional scene flow feature.

The corrector may apply an interpolation scheme to the detected hierarchical feature of the point cloud data, and upsample the hierarchical feature.

The corrector may perform warping for an inference value of the inferrer, and use the warped inference value as an input for extracting the hierarchical feature of the point cloud data.

In order to achieve the object, another exemplary embodiment of the present disclosure provides a scene flow estimation method including: detecting, by a hierarchical feature detector of a controller, a hierarchical feature of point cloud data related to an image frame; correcting, by a corrector of the controller, the detected hierarchical feature of the point cloud data; detecting, by a bi-directional feature detector of the controller, a bi-directional scene flow feature of the corrected point cloud data, re-inputting a detection value, and repeatedly detecting the bi-directional scene flow feature; and inferring, by an inferrer of the controller, a next scene flow of the image frame by using the bi-directional scene flow feature.

The scene flow estimation method may further include an initial scene detection step in which the bi-directional feature detector detects an initial scene flow of the point cloud data by using a predetermined voting block.

The initial scene detection step may include calculating, by the bi-directional feature detector, a voting value of grouped group points of the point cloud data by applying SoftMax to the voting block, and adding point groups with the voting value as a weight to extract an initial movement location used for detecting the initial scene flow.

The inference step may include inferring, by the inferrer, a scene flow of the next image frame by correcting the initial scene flow by using the bi-directional scene flow feature.

The correction step may include applying, by the corrector, an interpolation scheme to the detected hierarchical feature of the point cloud data, and upsampling the hierarchical feature.

The correction step may include performing, by the corrector, warping for an inference value of the inferrer, and using the warped inference value as an input for extracting the hierarchical feature of the point cloud data.

A further exemplary embodiment of the present disclosure provides a non-transitory computer readable medium containing program instructions executed by a processor, including: program instructions that detect a hierarchical feature of point cloud data related to an image frame; program instructions that correct the detected hierarchical feature of the point cloud data; program instructions that detect a bi-directional scene flow feature of the corrected point cloud data, re-input a detection value, and repeatedly detect the bi-directional scene flow feature; and program instructions that infer next scene flow of the image frame by using the bi-directional scene flow feature.

According to exemplary embodiments of the present disclosure, by a scene flow estimation apparatus, a method, and a non-transitory computer readable medium, a bi-directional flow embedding layer is changed to an iteration performing structure so as to re-input an output to enhance flow inference accuracy.

Further, an initial flow is inferred by introducing a voting block with respect to a bi-directional feature detected in each layer, and a flow predicted by a flow predictor is corrected by using the inferred initial flow to enhance the flow inference accuracy.

In addition, only an initial flow through voting other than all flow based flow inference is used for flow inference to reduce a computational amount.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIGS. 4A and 4B are diagrams illustrating a source code of the iteration performing structure in FIG. 3.

FIGS. 6A and 6B are diagrams illustrating a source code of a voting function for initial scene flow inference.

Figure 1:
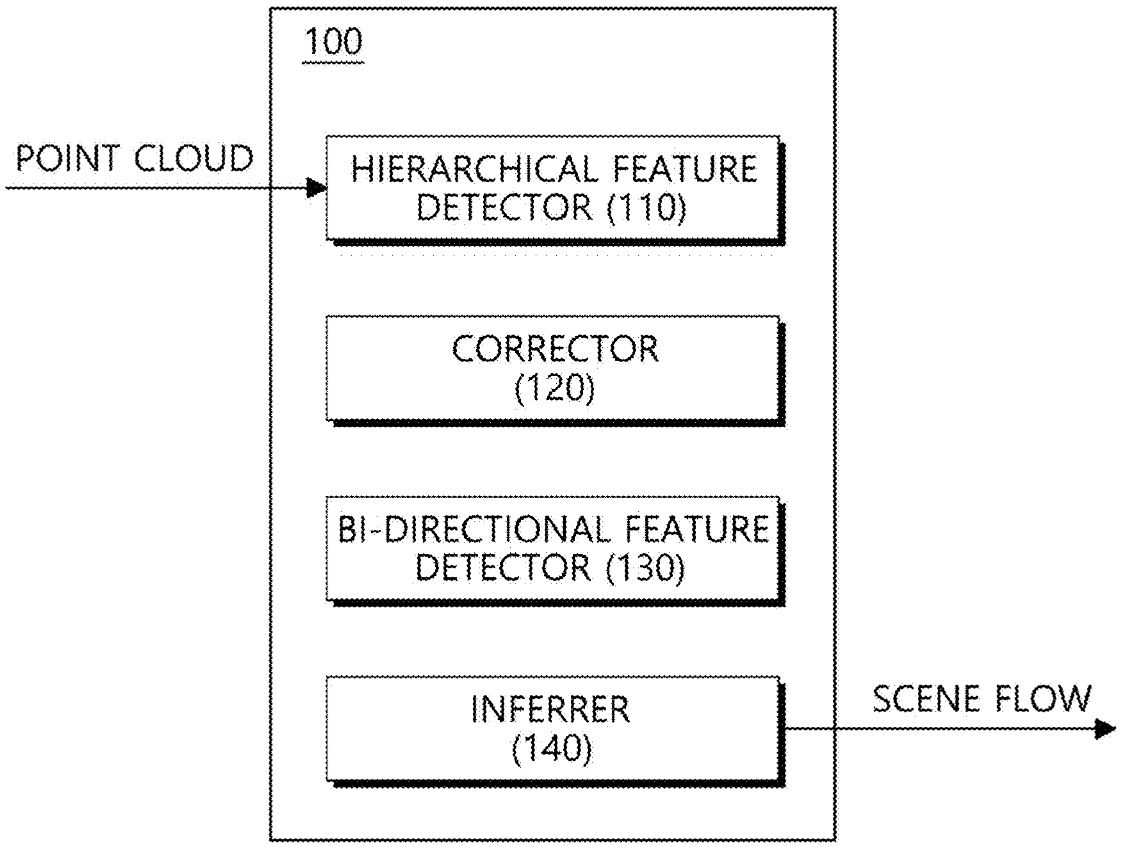
FIG. 1 is a block diagram of a scene flow estimation apparatus according to an exemplary embodiment of the present disclosure.

It should be understood that the appended drawings are not necessarily to scale, presenting a somewhat simplified representation of various features illustrative of the basic principles of the disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, an exemplary embodiment of the present disclosure will be described in detail with reference to the accompanying drawings. First, when reference numerals refer to components of each drawing, it is to be noted that although the same components are illustrated in different drawings, the same components are denoted by the same reference numerals as possible. Further, hereinafter, the exemplary embodiment of the present disclosure will be described, but the technical spirit of the present disclosure is not limited thereto or restricted thereby and the exemplary embodiment can be modified and variously executed by those skilled in the art.

FIG. 1 is a block diagram of a scene flow estimation apparatus according to an exemplary embodiment of the present disclosure.

Referring to FIG. 1, a scene flow estimation apparatus 100 according to an exemplary embodiment of the present disclosure as a kind of deep neural network model including a bi-point flow net applies a bi-directional flow embedding layer of an iteration performing structure to enhance flow prediction accuracy.

Further, the scene flow estimation apparatus 100 according to an exemplary embodiment of the present disclosure applies an initial flow inference scheme using a voting function to reduce the number of computational parameters and enhance the flow prediction accuracy.

The scene flow estimation apparatus 100 according to an exemplary embodiment of the present disclosure includes a hierarchical feature detector 110, a corrector 120, a bi-directional feature detector 130, and an inferrer 140.

Each of the above elements may constitute modules and/or devices of the scene flow estimation apparatus 100, which may be a controller. For example, the above elements of the scene flow estimation apparatus 100 may constitute hardware components that form part of a controller (e.g., modules or devices of a high-level controller), or may constitute individual controllers each having a processor and memory. The scene flow estimation apparatus 100 may include one or more processors and memory.

The hierarchical feature detector 110 may be defined as a hierarchical feature extraction structure among four hierarchical structures of the bi-point flow net.

The hierarchical feature detector 110 may receive point cloud data for at least two continuous image frames. Here, the image frame may include a source image frame and a target image frame. The source image frame may be constituted by a set of source points, and the target image frame may be constituted by a set of target points.

The hierarchical feature detector 110 may be configured as PointConv, and may detect a hierarchical feature of the point cloud data. The hierarchical feature may include step-specific features from a low step to a high step. The low step may have a low level and a high resolution. The high step may have a high level and a low resolution.

The corrector 120 may be defined as an upsampling structure among four hierarchical structures of the bi-point flow net.

The corrector 120 may upsample the hierarchical feature by applying an interpolation scheme to the detected hierarchical feature of the point cloud data from the high step, and propagate the upsampled high-step feature and scene flow to the low step.

The bi-directional feature detector 130 may be defined as a bi-directional flow embedding structure among four hierarchical structures of the bi-point flow net.

The bi-directional feature detector 130 may detect a bi-directional scene flow feature for each step of the upsampled source point (SP) and target point (TP). The bi-directional feature detector 130 may repeatedly perform a bi-directional scene flow feature detection process by inputting a detection value.

Further, the bi-directional feature detector 130 configures the voting block for each step of the upsampled point cloud data to detect an initial scene flow.

The inferrer 140 may be defined as a flow predictor structure among four hierarchical structures of the bi-point flow net.

The inferrer 140 may infer a scene flow of a next image frame by using the bi-directional scene flow feature for each step of the point cloud data. The inferrer 140 may repeatedly perform a scene flow inference process of the next image frame by inputting an inference value.

Further, the inferrer 140 may infer the scene flow of the next image frame by correcting the initial scene flow by using the bi-directional scene flow feature for each step of the point cloud data.

Figure 2:
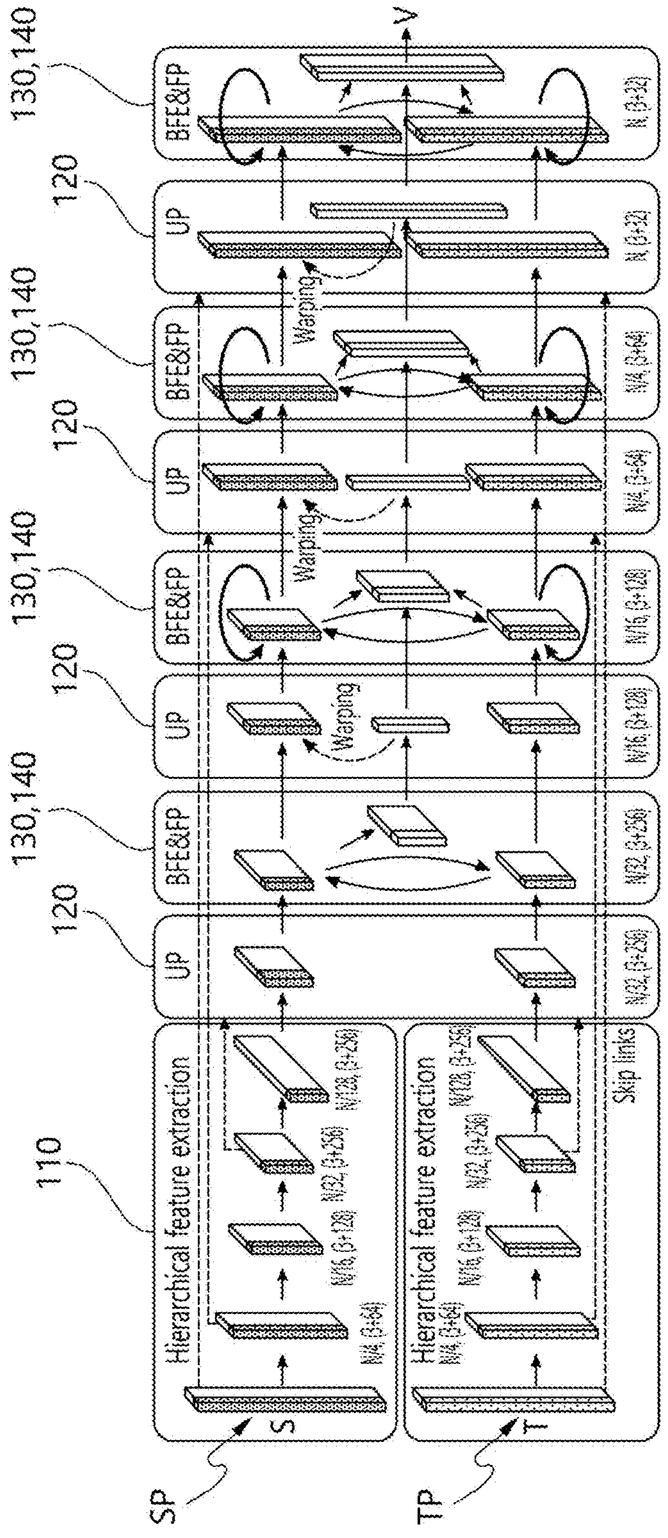
FIG. 2 is a diagram illustrating a hierarchical structure of the scene flow estimation apparatus according to an exemplary embodiment of the present disclosure.

FIG. 2 is a diagram illustrating a hierarchical structure of the scene flow estimation apparatus according to an exemplary embodiment of the present disclosure.

Referring to FIG. 2, the point cloud data may include a source point (SP) and a target point (TP) of continuous image frames.

The hierarchical feature detector 110 may detect a hierarchical feature of each of the source point SP and the target point TP in a hierarchical feature extraction structure.

The corrector 120 may upsample the feature by applying the interpolation scheme to the hierarchical feature of the source point SP and the target point TP detected in an upsampling (UP) structure from the high step, and propagate the upsampled high-step feature and scene flow to the low step.

The bi-directional feature detector 130 may detect the bi-directional scene flow feature for each step of the source point SP and target point TP upsampled in a bi-directional flow embedding (BFE) structure. The bi-directional feature detector 130 may repeatedly perform a bi-directional scene flow feature detection process by inputting a detection value.

Further, the bi-directional feature detector 130 configures the voting block for each step of the upsampled source point SP and target point TP to detect the initial scene flow.

The inferrer 140 may infer a scene flow V of the next image frame by using the bi-directional scene flow feature for each step of the source point SP and the target point TP in a flow predictor (FP) structure. The inferrer 140 may repeatedly perform the scene flow inference process of the next image frame by inputting an inference value.

Further, the inferrer 140 may infer the scene flow V of the next image frame by correcting the initial scene flow by using the bi-directional scene flow feature for each step of the point cloud data.

Figure 3:
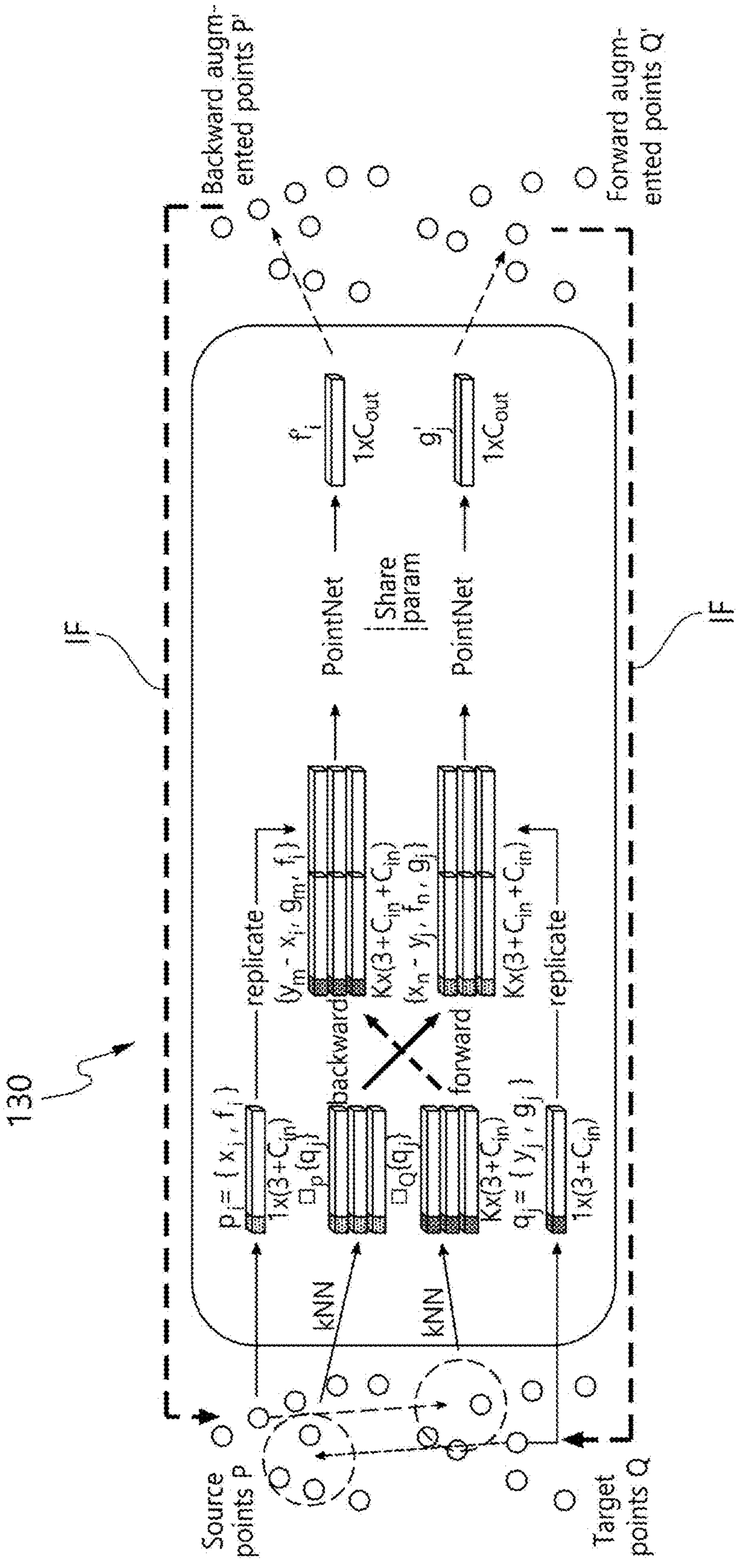
FIG. 3 is a diagram illustrating an iteration performing structure of a bi-directional flow embedding layer.

FIG. 3 is a diagram illustrating an iteration performing structure of a bi-directional flow embedding layer.

Referring to FIG. 3, an iteration performing structure of a bi-directional flow embedding layer may be seen.

The bi-directional feature detector 130 may repeatedly apply the bi-directional flow embedding layer detecting the feature of the bi-directional scene flow in order to increase a prediction performance while maintaining a model size.

The bi-directional scene flow feature detected in the iteration performing structure may be applied as an input of a next iteration performing structure.

The flow predictor (FP) may correct the initial scene flow by using the bi-directional scene flow feature detected in the iteration performing structure, and warp the target point and apply the warped target point as the input of the next iteration performing structure.

The iteration performing structure may be applied to each layer of the bi-directional flow embedding.

Hereinafter, a bi-directional feature detection process of the bi-directional flow embedding layer to which the iteration performing structure is applied will be described in detail.

The bi-directional feature detector 130 performs k-nearest neighbor (kNN) with respect to all points of a source frame and a target frame in the iteration performing structure to collect neighboring point groups from an opposing frame.

The bi-directional feature detector 130 combines the feature of the point of each of the source frame and the target frame with the feature of the neighboring point group to update the feature of the point.

The bi-directional feature detector 130 inputs the updated point feature into a next iteration performing structure according to a virtual input flow IF to repeatedly update the point feature.

Since the bi-directional feature detector 130 is based on the bi-point flow net structure, all updates may be completed in a previous step, and then the point feature may be passed to an upsampling layer of a next step. The point feature may be updated according to the iteration performing structure of the next step.

The point feature update according to the iteration performing structure may be conducted a predetermined number of repeated performing times.

Contents in which the point feature is updated by using an opposing feature in the iteration performing structure may be defined by repeated bi-directional feature detection.

The repeatedly updated point feature may be used for inferring the scene flow.

FIGS. 4A and 4B are diagrams illustrating a source code of the iteration performing structure in FIG. 3.

Referring to FIGS. 4A and 4B, a source code of the bi-directional feature detector 130 may be seen.

FIG. 4A illustrates a forward path source code of the bi-directional feature detector 130 before the iteration performing structure is applied.

FIG. 4B illustrates a forward path source code of the bi-directional feature detector 130 to which the iteration performing structure is applied.

Figure 5A:
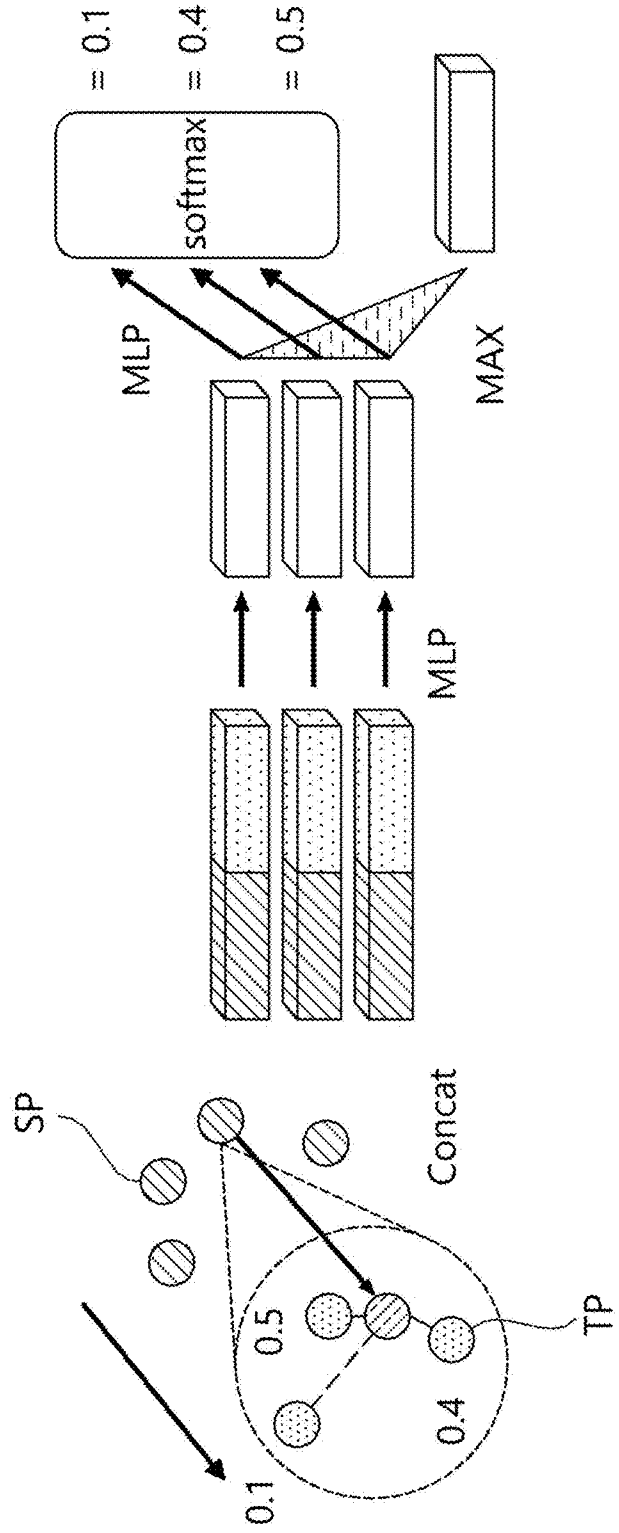
FIGS. 5A and 5B are diagrams illustrating an initial scene flow inference process of the scene flow estimation apparatus according to an exemplary embodiment of the present disclosure.
Figure 5B:
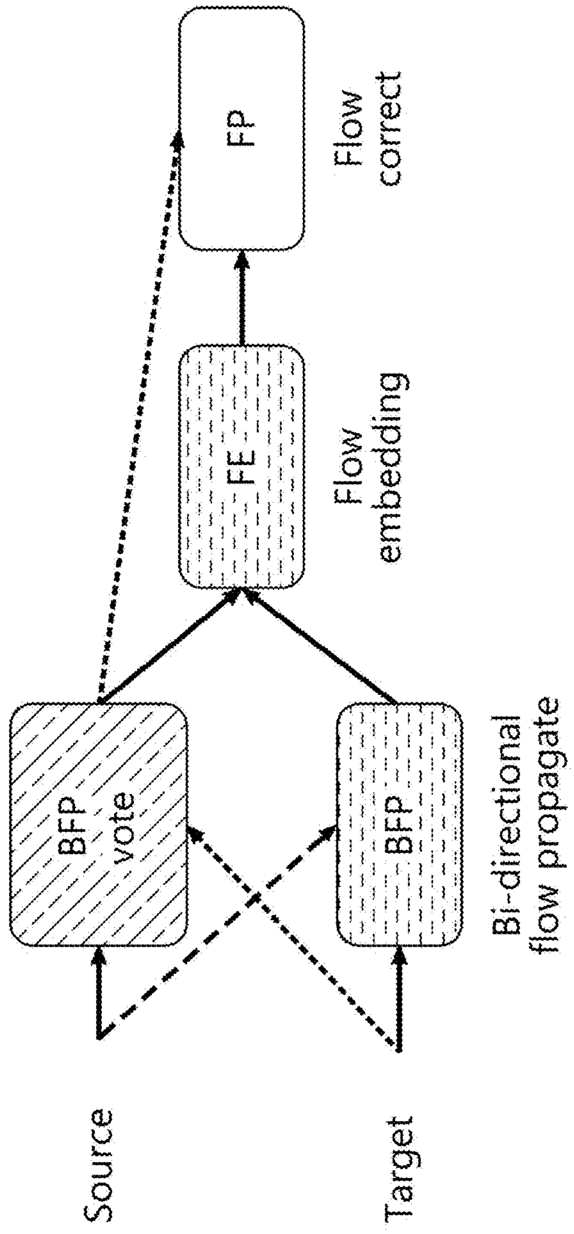

FIGS. 5A and 5B are diagrams illustrating an initial scene flow inference process of the scene flow estimation apparatus according to an exemplary embodiment of the present disclosure.

FIG. 5A is a diagram illustrating a process for extracting an initial movement location of the source point SP.

FIG. 5B is a diagram illustrating an initial scene flow inference process.

Referring to FIGS. 5A and 5B, the bi-directional feature detector 130 configures the voting block for each step of the upsampled source point SP and target point TP to detect the initial scene flow.

The bi-directional feature detector 130 introduces SoftMax in a bi-directional flow propagate (BFP) block of the bi-directional flow embedding (BFE) structure to infer a voting value of group points of the source point SP and the target point TP, and adds the group points by using the voting value as a weight to extract an initial movement location. In this case, Concatenate, Multi-Layer Perceptron (MLP), and MAX functions may be applied.

The bi-directional feature detector 130 may detect an initial scene flow through a difference between the extracted initial movement location and a current location.

The bi-directional feature detector 130 detects the initial scene flow, and then inputs the initial scene flow into the flow predictor FP, and corrects the initial scene flow through a feature of a bi-directional scene flow to finally detect a precise scene flow.

The voting block may be applied for each step of the source point SP and the target point TP.

Hereinafter, a voting operation principle will be described in detail.

The bi-directional feature detector 130 may collect neighboring point groups in a target frame based on a source frame. All group points have relative coordinates and features at centers of the groups, respectively.

The bi-directional feature detector 130 may perform feature transform of the group point through an MLP layer.

The bi-directional feature detector 130 may calculate a SoftMax value of each group point by using the transformed feature of the group point.

The bi-directional feature detector 130 may assign the calculated SoftMax value as a weight of the group point, and generate relative coordinates of all group points as a new vector by a weight sum scheme. The generated vector may be scene flow vectors.

Meanwhile, in general, SoftMax is used for a purpose of normalization for expression as a uniform probability value. The bi-directional flow embedding structure according to the present disclosure uses the SoftMax as the weight, not for representing as a probability value distribution. That is, the weight is calculated based on the feature of each group point.

For the same purpose, not the SoftMax but Multi-Layer Perceptron (MLP), Linear transformation, etc., are available, but the SoftMax serves as normalization, so abnormal numerical values (unexpected large numbers) may be avoid when the SoftMax is used.

FIGS. 6A and 6B are diagrams illustrating a source code of a voting function for initial scene flow inference.

FIG. 6A illustrates a model source code showing an output part of a flow embedding structure.

FIG. 6B illustrates a mode source code to which a voting function is applied.

Figure 7:
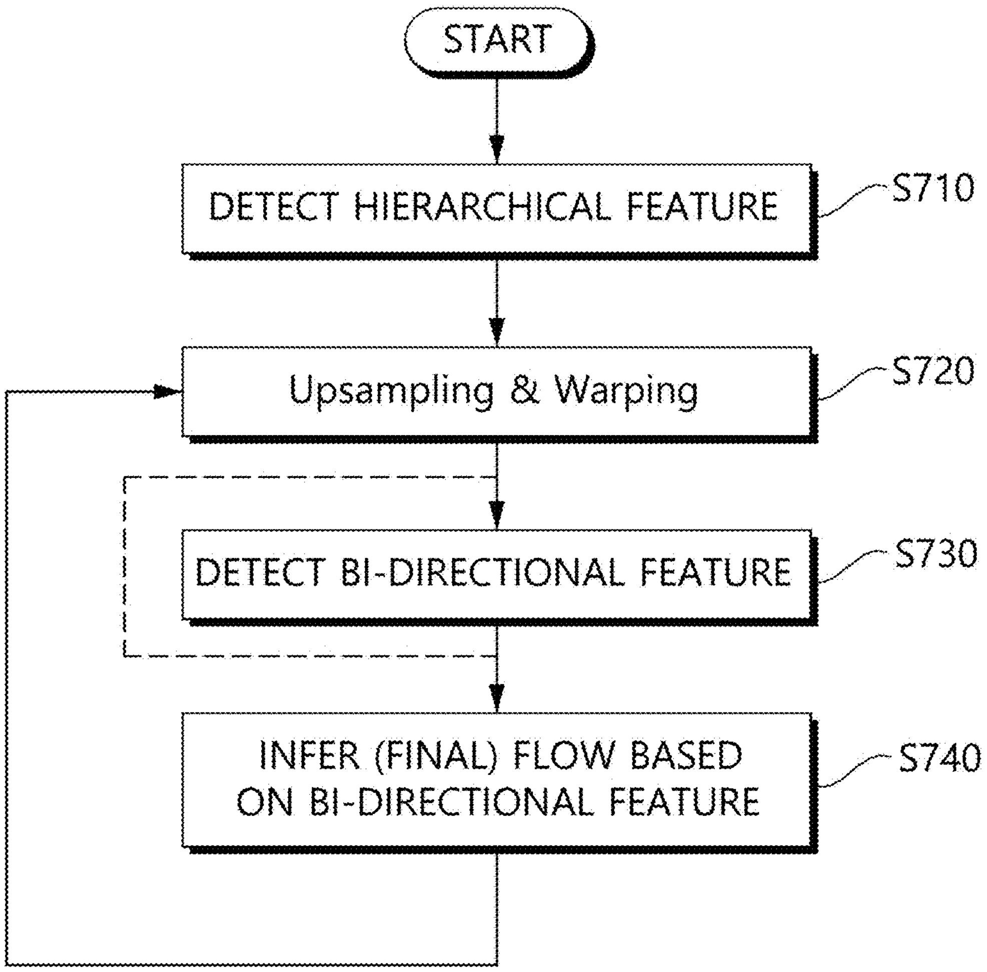
FIG. 7 is a flowchart including an iteration performing process of a bi-directional flow embedding layer in a scene flow estimation method according to an exemplary embodiment of the present disclosure.

FIG. 7 is a flowchart including an iteration performing process of a bi-directional flow embedding layer in a scene flow estimation method according to an exemplary embodiment of the present disclosure.

Referring to FIG. 7, a scene flow estimation method according to an exemplary embodiment of the present disclosure applies a bi-directional flow embedding layer of an iteration performing structure a kind of deep neural network model including a bi-point flow net to enhance flow prediction accuracy.

The scene flow estimation method according to an exemplary embodiment of the present disclosure may include a first detection step S710, a correction step S720, a second detection step S730, and an inference step S740.

In the first detection step S710, a hierarchical feature detector 110 may receive point cloud data for at least two continuous image frames. Here, the image frame may include a source image frame and a target image frame. The source image frame may be constituted by a set of source points, and the target image frame may be constituted by a set of target points.

The hierarchical feature detector 110 may be configured as PointConv, and may detect a hierarchical feature of the point cloud data. The hierarchical feature may include step-specific features from a low step to a high step. The low step may have a low level and a high resolution. The high step may have a high level and a low resolution.

In the correction step S720, a corrector 120 may upsample the feature by applying an interpolation scheme to the detected hierarchical feature of the point cloud data from the high step, and propagate the upsampled high-step feature and scene flow to the low step.

In the second detection step S730, the bi-directional feature detector 130 may detect a bi-directional scene flow feature for each step of the upsampled source point (SP) and target point (TP). In this case, flow embedding may be generated. The bi-directional feature detector 130 may repeatedly perform a bi-directional scene flow feature detection process by inputting a detection value.

In the inference step S740, an inferrer 140 may infer a scene flow of a next image frame by using the bi-directional scene flow feature for each step of the point cloud data. Meanwhile, in the correction step S720, the corrector 120 may performs warping for the inference value of the inferrer 140, and use the warped inference value as an input of the hierarchal feature of the point cloud data. Thereafter, the steps may be repeatedly performed.

Figure 8:
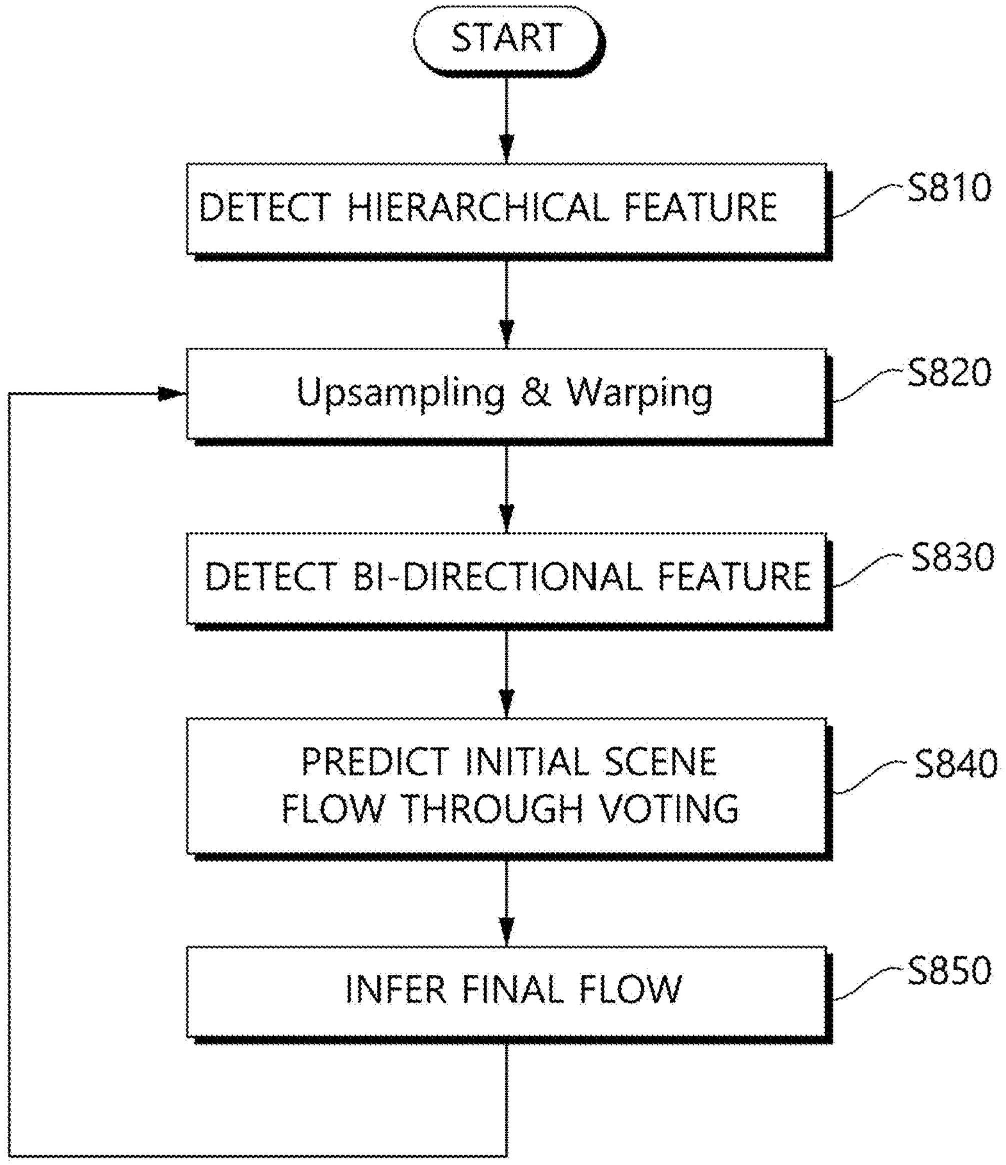
FIG. 8 is a flowchart including an initial scene flow inference process in the scene flow estimation method according to an exemplary embodiment of the present disclosure.

FIG. 8 is a flowchart including an initial scene flow inference process in the scene flow estimation method according to an exemplary embodiment of the present disclosure.

Referring to FIG. 8, a scene flow estimation method according to an exemplary embodiment of the present disclosure applies an initial flow inference scheme using a voting function to reduce the number of computational parameters and enhance the flow prediction accuracy.

Referring to FIG. 8, the scene flow estimation method according to an exemplary embodiment of the present disclosure may include a first detection step S810, a correction step S820, a second detection step S830, an initial scene detection step S840, and an inference step S850.

In the first detection step S810, a hierarchical feature detector 110 may receive point cloud data for at least two continuous image frames. Here, the image frame may include a source image frame and a target image frame. The source image frame may be constituted by a set of source points, and the target image frame may be constituted by a set of target points.

The hierarchical feature detector 110 may be configured as PointConv, and may detect a hierarchical feature of the point cloud data. The hierarchical feature may include step-specific features from a low step to a high step. The low step may have a low level and a high resolution. The high step may have a high level and a low resolution.

In the correction step S820, a corrector 120 may upsample the feature by applying an interpolation scheme to the detected hierarchical feature of the point cloud data from the high step, and propagate the upsampled high-step feature and scene flow to the low step.

In the second detection step S830, a bi-directional feature detector 130 may detect a bi-directional scene flow feature for each step of the upsampled source point (SP) and target point (TP). In this case, flow embedding may be generated. The bi-directional feature detector 130 may repeatedly perform a bi-directional scene flow feature detection process by inputting a detection value.

In the initial scene detection step S840, the bi-directional feature detector 130 configures the voting block for each step of the unsampled point cloud data to detect an initial scene flow. Here, the bi-directional feature detector 130 infers a voting value of grouped group points by applying SoftMax to a flow propagate block of a flow embedding layer, and adds the group points with the corresponding value as a weight to extract an initial movement location. Voting may be used for each step.

In the inference step S850, an inferrer 140 may infer a scene flow of a next image frame by using the bi-directional scene flow feature for each step of the point cloud data.

Further, the inferrer 140 may infer the scene flow of the next image frame by correcting the initial scene flow by inputting the bi-directional scene flow feature for each step of the point cloud data into the propagate block.

Meanwhile, in the correction step S820, the corrector 120 may performs warping for the inference value of the inferrer 140, and use the warped inference value as an input for extracting the hierarchal feature of the point cloud data. Thereafter, the steps may be repeatedly performed.

The above description just illustrates the technical spirit of the present disclosure and various changes, modifications, and substitutions can be made by those skilled in the art to which the present disclosure pertains without departing from an essential characteristic of the present disclosure. Therefore, the exemplary embodiments and the accompanying drawings disclosed in the present disclosure are used to not limit but describe the technical spirit of the present disclosure and the scope of the technical spirit of the present disclosure is not limited by the exemplary embodiments and the accompanying drawings.

The steps and/or operations according to the present disclosure may occur in different orders, in parallel, or concurrently in other exemplary embodiments for other epochs or the like, as may be understood by those skilled in the art.

Depending on the exemplary embodiment, at least some or all of the steps and/or operations may be implemented or performed by using commands, programs, and interactive data structures stored in one or more non-transitory computer-readable media, and one or more processors driving a client and/or a server. The one or more non-transitory computer-readable media may be, by way of example, software, firmware, hardware, and/or any combination thereof. Further, the functions of the "module" discussed in this specification may be implemented by software, firmware, hardware, and/or any combination thereof.

As described above, the exemplary embodiments have been described and illustrated in the drawings and the specification. The exemplary embodiments were chosen and described in order to explain certain principles of the disclosure and their practical application, to thereby enable others skilled in the art to make and utilize various exemplary embodiments of the present disclosure, as well as various alternatives and modifications thereof. As is evident from the foregoing description, certain aspects of the present disclosure are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the disclosure are deemed to be covered by the disclosure which is limited only by the claims which follow.

What is claimed is:

1. A scene flow estimation apparatus comprising:

a controller comprising:

a hierarchical feature detector configured to detect a hierarchical feature of point cloud data related to an image frame;

a corrector configured to correct the detected hierarchical feature of the point cloud data;

a bi-directional feature detector configured to detect a bi-directional scene flow feature of the corrected point cloud data, re-inputting a detection value, and repeatedly detecting the bi-directional scene flow feature; and an inferrer configured to infer a next scene flow of the image frame by using the bi-directional scene flow feature, wherein the bi-directional feature detector detects an initial scene flow of the point cloud data by using a predetermined voting block, and wherein the bi-directional feature detector calculates a voting value of grouped group points of the point cloud data by applying SoftMax to the voting block, and adds point groups with the voting value as a weight to extract an initial movement location used for detecting the initial scene flow.

2. The scene flow estimation apparatus of claim 1, wherein the inferrer infers a scene flow of the next image frame by correcting the initial scene flow by using the bi-directional scene flow feature.

3. The scene flow estimation apparatus of claim 1, wherein the corrector applies an interpolation scheme to the detected hierarchical feature of the point cloud data, and upsamples the hierarchical feature.

4. The scene flow estimation apparatus of claim 1, wherein the corrector performs warping for an inference value of the inferrer, and uses the warped inference value as an input for extracting the hierarchical feature of the point cloud data.

5. A scene flow estimation method comprising:

detecting, by a hierarchical feature detector of a controller, a hierarchical feature of point cloud data related to an image frame;

correcting, by a corrector of the controller, the detected hierarchical feature of the point cloud data;

detecting, by a bi-directional feature detector of the controller, a bi-directional scene flow feature of the corrected point cloud data, re-inputting a detection value, and repeatedly detecting the bi-directional scene flow feature;

inferring, by an inferrer of the controller, a next scene flow of the image frame by using the bi-directional scene flow feature; and detecting, by the bi-directional feature detector of the controller, an initial scene flow of the point cloud data by using a predetermined voting block, wherein detecting the initial flow includes:

calculating, by the bi-directional feature detector, a voting value of grouped group points of the point cloud data by applying SoftMax to the voting block, and adding point groups with the voting value as a weight to extract an initial movement location used for detecting the initial scene flow.

6. The scene flow estimation method of claim 5, wherein inferring the next scene flow includes:

inferring, by the inferrer of the controller, a scene flow of the next image frame by correcting the initial scene flow by using the bi-directional scene flow feature.

7. The scene flow estimation method of claim 5, wherein correcting the detected hierarchical feature includes:

applying, by the corrector of the controller, an interpolation scheme to the detected hierarchical feature of the point cloud data, and upsampling the hierarchical feature.

8. The scene flow estimation method of claim 5, wherein correcting the detected hierarchical feature includes:

performing, by the corrector of the controller, warping for an inference value of the inferrer, and using the warped inference value as an input for extracting the hierarchical feature of the point cloud data.

9. A non-transitory computer readable medium containing program instructions executed by a processor, the computer readable medium comprising:

program instructions that detect a hierarchical feature of point cloud data related to an image frame;

program instructions that correct the detected hierarchical feature of the point cloud data;

program instructions that detect a bi-directional scene flow feature of the corrected point cloud data, re-input a detection value, and repeatedly detect the bi-directional scene flow feature;

program instructions that infer next scene flow of the image frame by using the bi-directional scene flow feature;

program instructions that detect an initial scene flow of the point cloud data by using a predetermined voting block; and program instructions that calculate a voting value of grouped group points of the point cloud data by applying SoftMax to the voting block, and add point groups with the voting value as a weight to extract an initial movement location used for detecting the initial scene flow.

* * * * *